United States Patent [19]
Sasaki et al.

[11] 3,853,701
[45] Dec. 10, 1974

[54] NUCLEAR REACTOR CORE ASSEMBLY

[75] Inventors: Youichi Sasaki; Hisao Tomita, both of Yokohama, Japan

[73] Assignee: Tokyo Shibaura Electric Company Ltd., Kanagawa-ken, Japan

[22] Filed: Dec. 28, 1971

[21] Appl. No.: 213,049

[30] Foreign Application Priority Data
  Dec. 28, 1970  Japan.............................. 45-120353
  Feb. 23, 1970  Japan.............................. 45-132802

[52] U.S. Cl....................... 176/50, 176/43, 176/61, 176/76, 176/87
[51] Int. Cl........................... G21c 3/30, G21c 3/34
[58] Field of Search............. 176/50, 87, 78, 43, 61, 176/64, 76

[56] References Cited
UNITED STATES PATENTS
| | | | |
|---|---|---|---|
| 3,205,147 | 9/1965 | Foure et al. ...................... | 176/64 X |
| 3,368,946 | 2/1968 | Jenssen............................ | 176/61 X |
| 3,697,375 | 10/1972 | Suvanto et al........................ | 176/78 |
| 3,745,069 | 7/1973 | Sofer et al. ............................ | 176/78 |
| R27,173 | 9/1971 | Lass et al........................ | 176/87 X |

FOREIGN PATENTS OR APPLICATIONS
| | | | |
|---|---|---|---|
| 668,946 | 8/1963 | Canada................................ | 176/43 |

*Primary Examiner*—Leland A. Sebastian
*Assistant Examiner*—Roger S. Gaither
*Attorney, Agent, or Firm*—Oblon, Fisher, Spivak, McClelland & Maier

[57]  ABSTRACT

A structure is disclosed for rendering nuclear reactor cores, particularly the fluid cooled type, more resistant to earthquake shocks and similar vibrations. The structure includes an upper framework including a plurality of leaf spring members for resiliently supporting upper end portions of the reactor fuel bundles. In addition, vertically oriented, rectangular shaped baffles are appropriately positioned throughout the reactor core to restrain movement of the coolant fluid.

3 Claims, 6 Drawing Figures

NUCLEAR REACTOR CORE ASSEMBLY

BACKGROUND OF THE INVENTION

1. Field of the Invention

This invention relates to a nuclear fission reactor core assembly, and more particularly to an improvement in earthquake proofing the same.

2. Description of the Prior Art

In a nuclear reactor, such as BWR type reactor, the reactor core generally has a number of fuel bundles surrounded by a shroud positioned in the reactor pressure vessel. Each fuel bundle comprises a plurality of fuel elements which contain the fissile material, and which may have various shapes, such as plates, tubes or rods. For convenience, these fuel elements will hereinafter be referred to as fuel rods. The fuel rods are grouped together at fixed distances from each other and are mounted in an elongated casing or a channel forming a fuel bundle. A sufficient number of these fuel bundles are combined at substantially fixed distances from each other in vertical orientation to form the reactor core, which is capable of maintaining a self-sustained fission reaction. The core is disposed in the shroud, which is in turn disposed within a vessel containing a coolant fluid, such as water. The coolant is caused, by a recirculation pump, for example, to flow upwards through both the exterior and interior of the fuel bundle channels in the shroud, and flows downwards through the return passage defined by the shroud and the vessel.

In order to obtain high efficiency, each fuel bundle is supported at the top and bottom thereof by top and bottom grids respectively. The bottom grid, for example, comprises a plurality of sockets mounted on a bottom grid plate for receiving a bottom fitting of each fuel bundle. A plurality of cruciform shaped openings are also provided for insertion of cruciform shaped control rods. The top grid may, for example, comprise a lattice-like framework. Within each lattice a plurality of fuel bundles (generally four) are inserted and then supported at the top end portion thereof by the top grid. The lower end of each of the fuel bundles is engaged with, and supported by, the sockets of the bottom grid. The top end portions of the fuel bundles in one lattice are customarily forced towards the grid frames by means of springs, or so-called "channel fasteners" to resiliently separate them from each other, and also to restrict vibrations of the fuel bundles due especially to thermal problems. Details of such are disclosed in a copending U.S. patent application Ser. No. 158,223 by Sasaki, et al., assigned to the same assignee as the present application.

With previous designs, thermal problems and efficiency of the reactor have been the chief considerations, but the behavior of the fuel bundle in an earthquake has scarcely been considered.

SUMMARY OF THE INVENTION

Accordingly, one object of this invention is to provide a nuclear reactor core assembly, including a supporting structure for fuel bundles, with an improved resistance to earthquakes.

Another object of this invention is to provide a structure for restricting the movement of the coolant fluid in a reactor core to increase the ability of the reactor to withstand earthquake shocks and similar vibrations.

Briefly stated, these and other objects are achieved in accordance with one aspect of the invention by providing a nuclear reactor core assembly surrounded by coolant fluid, and including a plurality of fuel bundles, the bottom ends of which are supported by a bottom grid structure. A top grid structure comprising a framework is provided to define a plurality of lattices for supporting the upper end portions of the fuel bundles, and leaf springs are secured to each surface abutting upon the upper end portion of the fuel bundles for resiliently supporting the same in all directions.

According to another aspect of the invention, a plurality of baffle members of elongated substantially rectangular shape and having a plurality of through holes are provided in a nuclear reactor core assembly. The baffle members are placed among the fuel bundles in alternative orientations in spaces where control rods are not inserted.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION OF THE PREFERRED EMBODIMENTS

Figure 1:
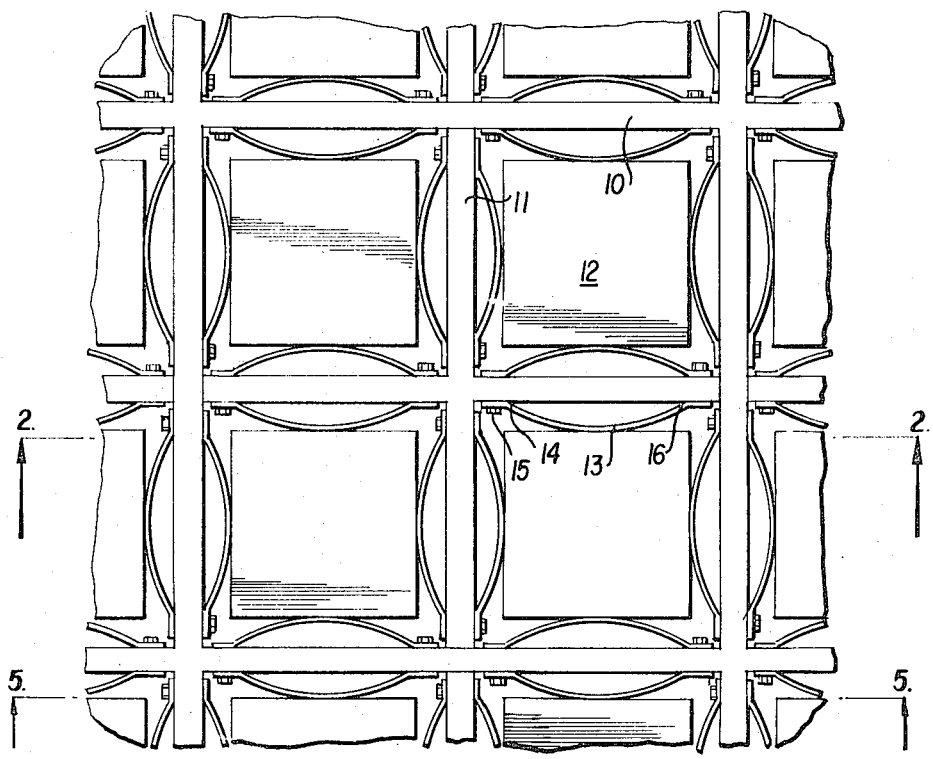
FIG. 1 is a plan view of a portion of the top grid structure of one embodiment according to the present invention.
Figure 2:
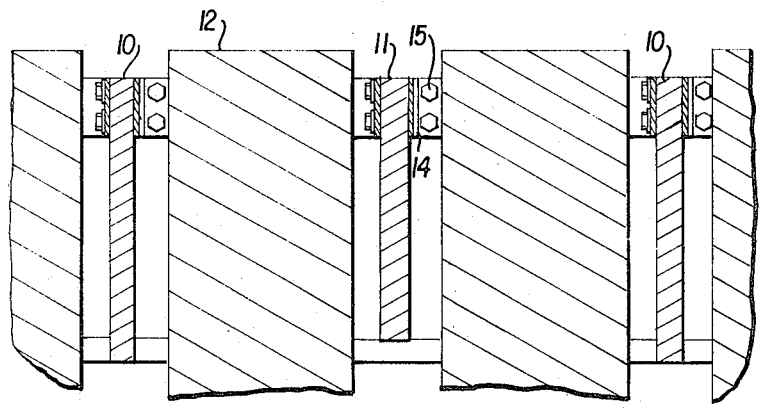
FIG. 2 is a cross sectional view taken along II—II line of the embodiment shown in FIG. 1.

Referring now to the drawings wherein like reference numerals designate identical or corresponding parts throughout the several views, and more particularly to FIGS. 1 and 2 thereof, the numeral 10 indicates a lattice-like framework of the top grid provided in the upper portion of the reactor core assembly. There are further provided auxiliary frame members 11 of cruciform configuration in each cell defined by the grid framework 10, thereby forming four blocks to be loaded with respective fuel bundles 12. There are provided inwardly curved leaf or plate springs 13 on each side wall of the frame members, one end portion 14 of each leaf spring 13 being secured to the frame member by suitable means such as a pair of bolts 15, and the other end portion 16 being free to smoothly contact and slide on the frame member. Thus the top portion of each fuel bundle is resiliently supported by four leaf springs in substantially coaxial relation to each block defined by the frame members of the top grid. The bottom fitting of each fuel bundle is engaged with a corresponding socket in the bottom grid, not shown.

Figure 3:
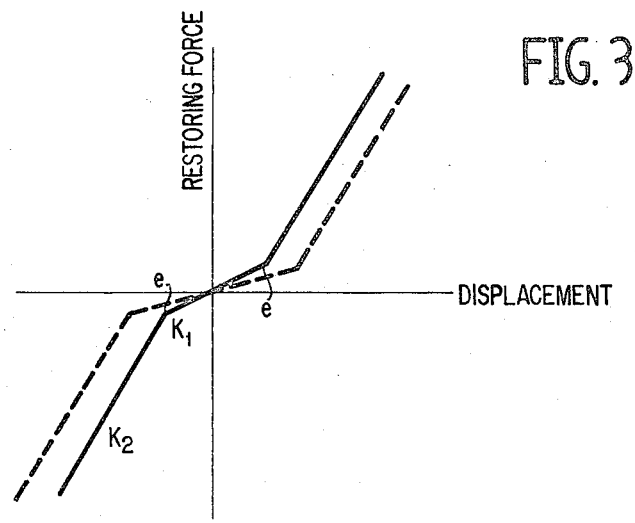
FIG. 3 is a graphical diagram illustrating restoring force versus displacement of the fuel bundle according to the embodiment shown in FIGS. 1 and 2.

Against relatively small displacements of each fuel bundle due to small vibrations thereof, the leaf springs are deformed, providing a restoring force $K_1$, as shown in FIG. 3, to each fuel bundle provided there is no abutment between the fuel bundle and the frame member. The restoring force $K_1$ is substantially determined by the constant of the leaf spring 13.

The behavior of the fuel bundle (in the coolant fluid and at normal operation temperatures) upon the occurrance of an earthquake is such that abutment occurs between the fuel bundle and the frame member. That is, during an earthquake, the fuel bundle vibrates in its first vibrational mode, that is, with a pair of nodes at its top and bottom portions and having a loop at its center portion. This is due to the fact that the vibrational frequency of an earthquake is relatively low.

Accordingly, against the displacement of each fuel bundle under the condition that abutment occurs between the fuel bundle and the frame member, the restoring force acting on the fuel bundle becomes $K_2$, as shown in FIG. 3. This restoring force $K_2$ is chiefly determined by the rigidity or stiffness of the fuel bundle.

Thus the total restoring force acting on the fuel bundle with respect to the displacement thereof becomes non-linear, having a break point as shown in FIG. 3, although the curve has no actual discontinuities. The break point and/or the coefficient of the restoring force $K_1$ may be modified by the changing the design of the leaf spring 13 so that the above mentioned non-linear characteristics may be changed as desired, as shown, for example, by the dotted line in FIG. 3. If the stiffness of the leaf spring is so great that there is no collision between the fuel bundle and the frame member under the prescribed vibration range of the fuel bundle, the restoring force always remains linear with respect to the displacement of the fuel bundle. This defines the upper limit of the stiffness of the leaf spring in order to obtain a non-linear characteristic.

Figure 4:
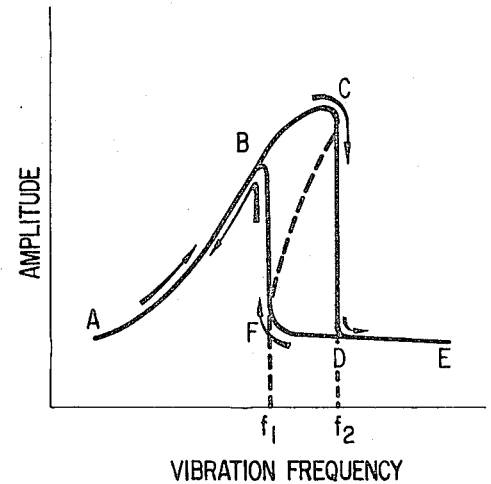
FIG. 4 is a graphical diagram illustrating a resonance curve of a vibrating member having the characteristics shown in FIG. 3.

The non-linear characteristic provides a bi-stable mode of vibration, in a certain frequency range, to cause a hysteresis loop as shown in FIG. 4. The graph in FIG. 4 shows the resonance curve of the fuel bundle, the abcissa representing the vibration frequency and the ordinate representing the amplitude of the vibration of the fuel bundle in substantially the central portion thereof. In the displacement range $e-e$ in FIG. 3, the vibrational behavior of the fuel bundle differs from the first mode vibration, described above. Then in FIG. 4 the amplitude in this range is replaced by the value of the assumed case wherein the fuel bundle vibrates in its first vibrational mode.

Referring to FIG. 4, as the frequency of the vibration of the fuel bundle increases, the amplitude thereof increases, as shown by the curve segment A→ B →C, up to a certain frequency $f_2$, and gradually decreases, as shown by the curve segment D → E. On the other hand, as the frequency decreases, the amplitude gradually increases, as shown by the curve segment E → D → F, the jumps up to B at a frequency $f_1$, and finally decreases as shown by the curve segment B → A. Thus, in the frequency range between $f_1$ and $f_2$, the amplitude may have either a relatively high or low value. Which one of these two values may be taken depends upon the initial condition.

It is noted, however, that where the fuel bundle vibrates with the amplitude of the high value at a certain frequency in the frequency range $f_1$ to $f_2$, if the fuel bundle undergoes a restriction against vibration, caused by insertion of the control rods for example, the amplitude of the vibration of the fuel bundle may drop down to the low value, as shown by the curve segment F → D in FIG. 4.

Nuclear reactors customarily employ vibration detecting means, and are constructed such that the control rods are rapidly inserted to quickly decrease the output power of the reactor when vibration over a predetermined amplitude is detected. Thus, if a vibration detector is used, the amplitude of the vibration of the fuel bundle may be effectively restricted by making use of the non-linear characteristic mentioned above.

The leaf spring may be constructed of a single part or panel, or of a plurality of laminate parts or panels arranged one over another. Use of the laminated leaf spring provides a damping effect on the vibration energy, due to the friction occurring between laminated parts of the spring.

Figure 6:
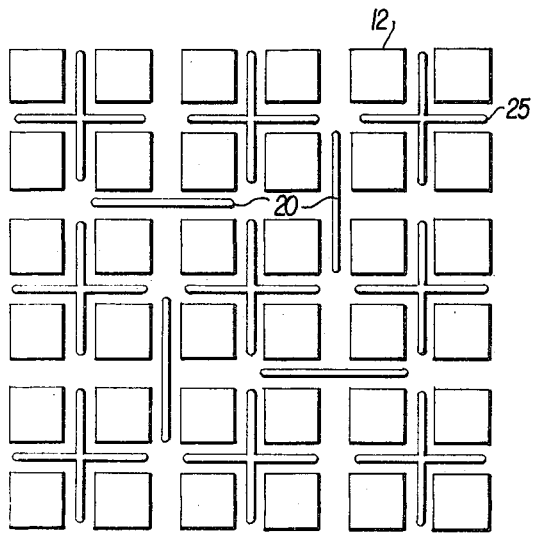
Figure 5:
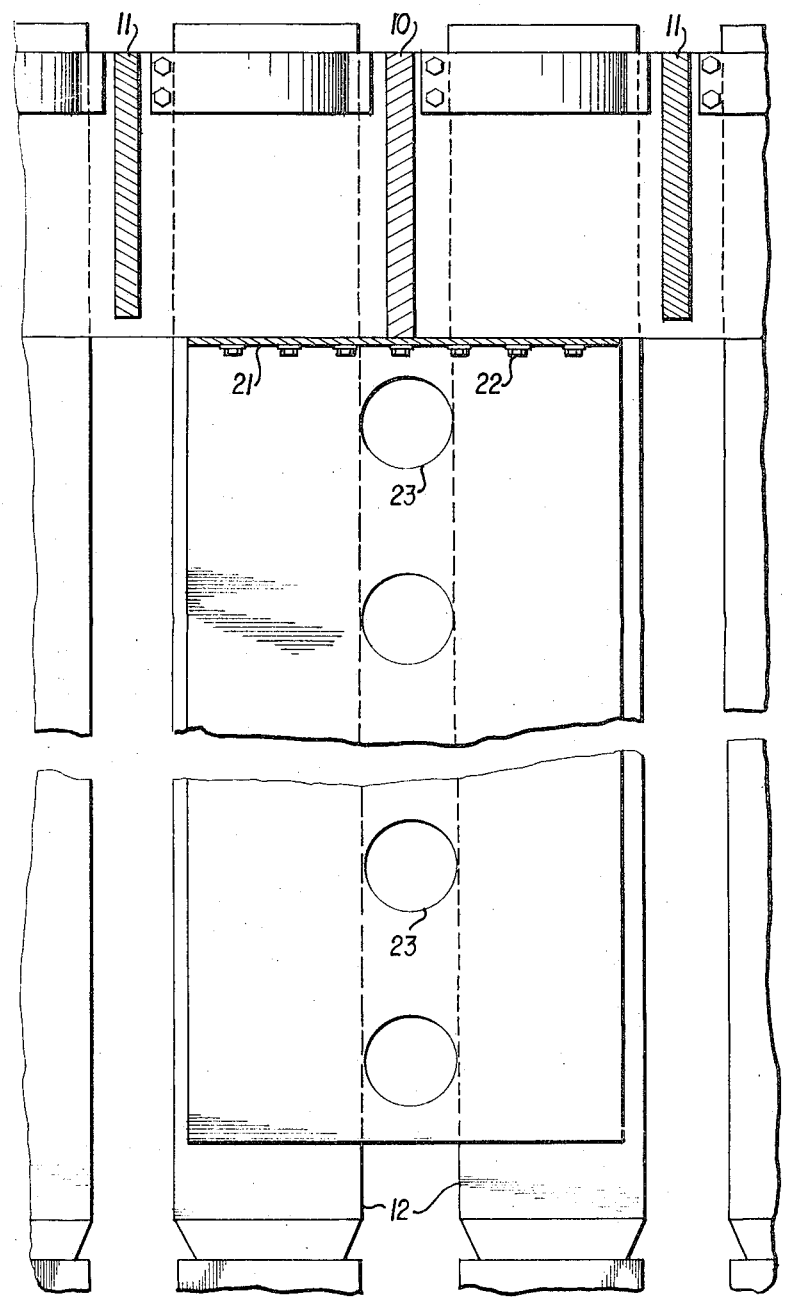
FIG. 5 is a partial cross sectional view of another embodiment according to this invention; and, FIG. 6 is a schematic plan view of the embodiment shown in FIG. 5.

Referring now to FIGS. 5 and 6, another embodiment of the invention is shown which is capable of restricting the movement of coolant fluid near the fuel bundles in a substantially horizontal direction.

When an earthquake hits a nuclear reactor plant, coolant fluid flows in a substantially horizontal direction in the space among the fuel bundles, while the fuel bundles vibrate. The movement of the coolant fluid near the fuel bundles causes the fuel bundles to increase their vibration amplitude, with the result that a likelihood of a dangerous fault due to damage of the fuel bundles arises.

The amplitude of the vibration of the fuel bundles in the coolant fluid is liable to assume the maximum value when the fuel bundles vibrate in substantially the same phase, that is, when the whole body of coolant fluid flows in substantially the same direction.

According to this embodiment of the invention, in order to restrict the movement of the coolant fluid, there are provided suitable baffle members, each having a plurality of through holes.

It is well known in the art that the causation of turbulent flow by providing narrow channels in the liquid flow passage causes the flowing liquid to lose its kinetic energy. The amount of lost energy is proportional to the second power of the speed of the flow, and thus becomes larger as the amount of flowing liquid becomes larger.

As is shown in FIG. 5, the numeral 20 indicates a vertically elongated baffle member of relatively thin metal plate, disposed in the space defined by the aligned fuel bundles. The baffle member has a vertical dimension covering substantially the whole length of the fuel bundle 12 and a horizontal dimension covering about twice the width of the fuel bundle (about 40 cm). It further has a folded edge portion 21 which is secured to the underside of the frame member 10 by suitable means such as bolts 22. The baffle member 20 is also provided with through holes 23 substantially along the vertical center line thereof at fixed distances from each other. The distance between the centers of the adjacent holes may be about 10cm, and the diameter of the holes 23 may be substantially equal to the distance between the adjacent fuel bundles.

A plurality of the above baffle members are disposed as shown in FIG. 6 wherein numeral 25 designates cruciform shaped control rods. A sufficient number of the baffle members are placed in spaces among the external surfaces of the fuel bundles where none of the cruciform control rods are to be inserted, and are placed in alternative orientations with respect to each other, thereby forming a damping means capable of restricting the coolant movement in either direction, and causing the coolant to lose its kinetic energy.

The baffle member 20 is preferably made of metal having a characteristic of absorption of only a small neutron flux, such as zirconium alloy, like Zircaroy for example. The rigidity of the baffle member is liable to cause adverse effects, such as the vibration of the baffle member itself. Accordingly, the baffle member should be made as thin as possible. But the minimum value of the thickness of the baffle member is limited by the required life of the baffle member. Thus, it is necessary to design the baffle member with these problems in mind.

When the coolant flow occurs in a substantially horizontal direction, the baffle members positioned normal to the flow resist the flow, so that the baffle members flex downstream, and abut the fuel bundles in the downstream direction. Thus most of the passages for fluid flow are blocked by the baffle members, leaving only a small passage defined by the holes 23 with the result that a turbulent flow occurs. This causes the fluid to lose its kinetic energy, and accordingly the movement of the fluid is effectively restricted.

It is noted that the nuclear reactor core assembly according to this invention is adaptable to nuclear fission reactors of types such as BWR and PWR, wherein light or heavy water may be used as the coolant fluid.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A fluid cooled nuclear reactor core structure, comprising:
   a plurality of substantially parallel, elongated fuel bundles each having a plurality of substantially parallel, elongated fuel rods encased therein;
   a bottom grid structure positioned transverse to said fuel bundles having supporting means for engaging the bottom ends of each of said fuel bundles and means for inserting control rods therethrough;
   a top grid structure positioned transverse to said fuel bundles formed by a plurality of intersecting frames members which form a plurality of framework openings each having a plurality of substantially flat side surfaces which face and support the upper portion of said fuel bundles, each one of said fuel bundles extending through and being supported within a separate one of said openings; and
   a plurality of leaf springs, each one of which is secured to each of said side surfaces of said framework openings which faces said upper portion of said fuel bundles for resiliently supporting said fuel bundles in a transverse direction.

2. A fluid cooled nuclear reactor core structure according to claim 1, further comprising:
   a plurality of vertically oriented baffle members of elongated, substantially rectangular shape, each having a plurality of through holes and composed of a material having relatively small neutron flux absorption characteristics,
   said baffle members secured at their upper ends to the underside of said top grid structure so as to be disposed among said fuel bundles at positions where control rods are not inserted, said baffle members further oriented in alternating directions in said core structure such that the elongated edge of each member is substantially perpendicular to the next adjacent member, whereby movement of said fluid coolant is restricted in a direction transverse to said fuel bundles within said core structure.

3. A fluid cooled nuclear reactor core structure having a plurality of substantially parallel, elongated fuel bundles comprising:
   a top grid structure positioned transverse to said fuel bundles formed by a plurality of intersecting frame members which form a plurality of framework openings for supporting the upper portions of said fuel bundles;
   a bottom grid structure positioned transverse to said fuel bundles;
   supporting means provided on said bottom grid structure for engaging bottom ends of each of said fuel bundles;
   means for inserting control rods through said bottom grid structure; and,
   vertically oriented baffle members of elongated, substantially rectangular shape, each having a plurality of through holes and composed of a material having relatively small neutron flux absorption characteristics,
   said baffle members oriented in alternating directions in said core structure such that the elongated edge of each member is substantially perpendicular to the next adjacent member, said baffle members further secured at their upper ends to the underside of said top grid structure and disposed among said fuel bundles at positions where control rods are not inserted,
   whereby movement of said fluid coolant is restricted in a direction transverse to said fuel bundles.

* * * * *